Figure 10:
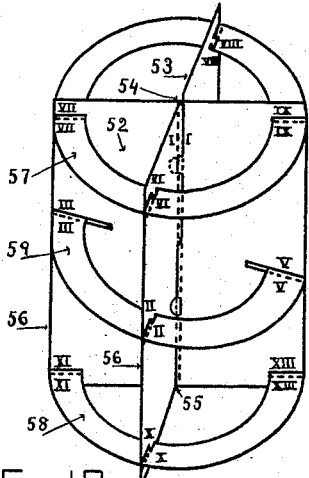

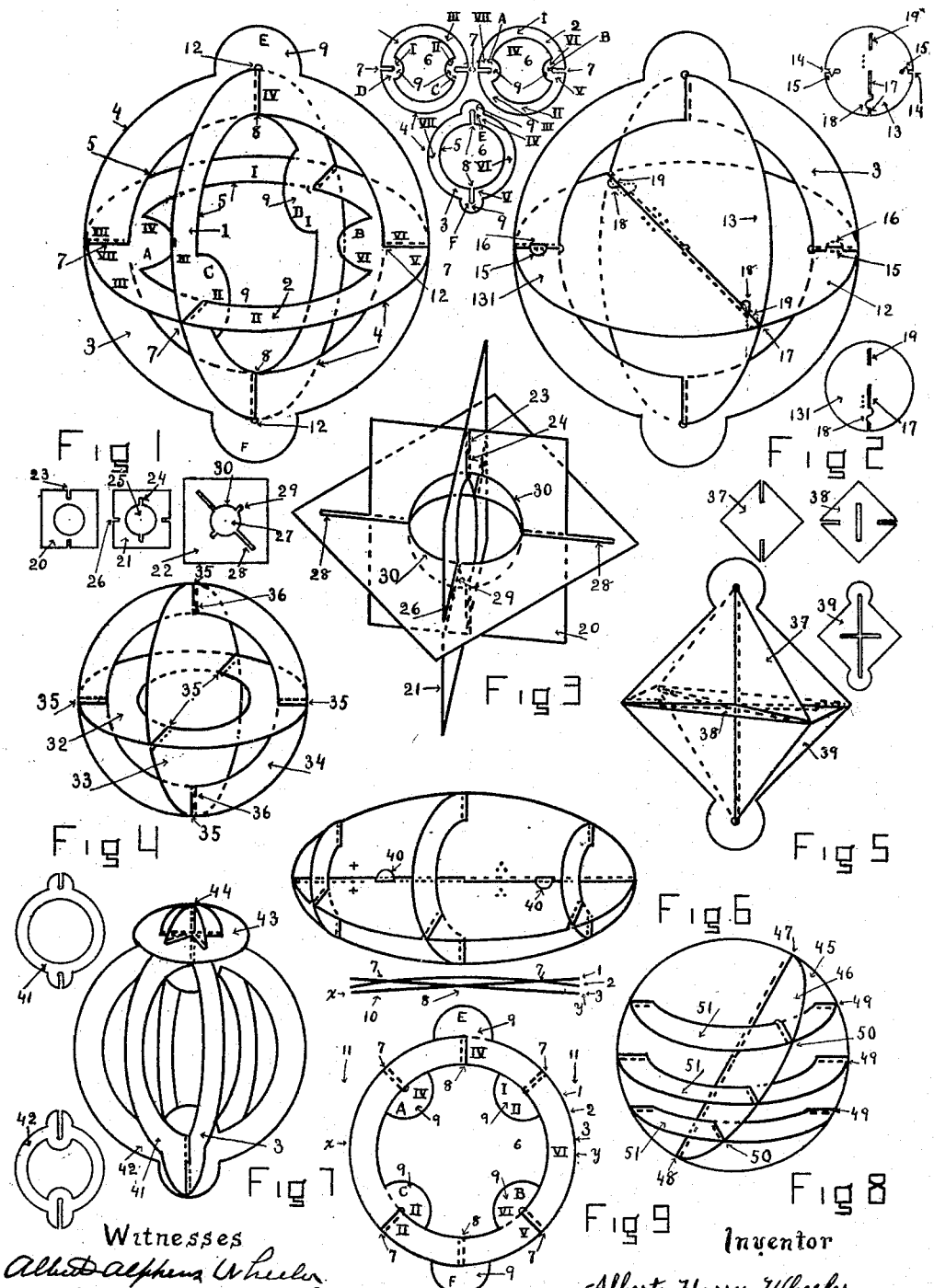

A. H. WHEELER.
MATHEMATICAL MODEL.
APPLICATION FILED SEPT. 3, 1914.

1,192,483.

Patented July 25, 1916.
3 SHEETS—SHEET 2.

Witnesses
Albert Alpheus Wheeler
Helen Marion Wheeler

Inventor
Albert Harry Wheeler.

THE NORRIS PETERS CO., WASHINGTON, D. C.

A. H. WHEELER.
MATHEMATICAL MODEL.
APPLICATION FILED SEPT. 3, 1914.

1,192,483.

Patented July 25, 1916.
3 SHEETS—SHEET 3.

Witnesses
Albert Alpheus Wheeler
Helen Marion Wheeler

Inventor
Albert Harry Wheeler.

UNITED STATES PATENT OFFICE.

ALBERT HARRY WHEELER, OF WORCESTER, MASSACHUSETTS.

MATHEMATICAL MODEL.

1,192,483.     Specification of Letters Patent.     Patented July 25, 1916.

Application filed September 3, 1914. Serial No. 860,041.

*To all whom it may concern:*

Be it known that I, ALBERT HARRY WHEELER, a citizen of the United States, residing at Worcester, in the county of Worcester and State of Massachusetts, have invented a new and useful Mathematical Model, of which the following is a specification.

My invention relates to improvements in mathematical models or the like in which skeleton-like or sectional forms of construction are provided which may be assembled or combined in a great variety of ways to build up or construct mathematical models of many interesting and important forms and proportions which illustrate, represent, show and define mathematical and geometrical relations, proportions and forms and apply principles of mathematical, physical and mechanical sciences and simplify their presentation and conception to the mind.

It relates, in particular, to the presentation and construction of geometrical forms and figures, of relations and principles of geographical and astronomical science, of natural crystalline forms and of certain conventional and symbolical forms and figures which are commonly applied and recognized in the arts and sciences.

In the mathematical sciences, in particular there are forms, relations, proportions, figures, diagrams and concepts in plane, solid, spherical and special surface goemetries, of the conic sections and descriptive branches of geometry and there are lines, points, surfaces and solids in their individual and mutual relations which are difficult to represent, present to the mind or to conceive of or imagine, which by the means and methods which I am about to explain and set forth may be readily, clearly and simply set forth, seen and understood.

My invention relates to certain methods and means for attaining such results by very easily constructed and simply devised means which are inexpensive and may be produced in great quantities at very little expenditure of time, material or cost.

The principal objects of my invention are to provide for constructing a comparatively great number of mathematical models or the like out of a relatively small number of pieces, parts or blanks and to so construct these parts or blanks that they may be interchanged among themselves in a great variety of ways to produce many variations in construction and form; to provide simple and efficient means for securing such parts or members together in engaged or interlocked position, either temporarily or permanently; to provide constructions whereby alterations or variations in form may be easily and directly obtained; to provide improvements in construction and manufacture whereby the device may be efficient in operation, and can be made in a very simple manner; to provide means whereby, if desired, the device may be collapsed and made to assume flat or nearly flat position and thus may be carried around in very small compass; to provide simple construction of relatively movable parts of such nature that the form or appearance of the device may be changed by moving the parts or members relatively to each other; to provide convenient means for operating the same; to provide means whereby additional parts may be easily introduced or old ones removed as may be desired; to provide means for receiving upon their surfaces numbers, letters, symbols or other suitable distinguishable marks or entries of information which may be read and understood and utilized to distinguish and designate parts or members or regions of the same with reference to each other, or to indicate parts or members which may be brought into desired or proper registration, engagement or other relation with reference to each other, or to serve as means for indicating convenient or necessary order of engagement together or assembling together of parts to provide for particular forms of constructions; to provide certain forms of skeleton-like or sectional construction whereby all parts of the constructed figure or model may be easily accessible and readily inspected and examined; to provide locking devices whereby it will be impossible for parts to become accidentally separated from each other and displaced or lost.

Further objects and advantages of the invention will appear hereinafter.

Reference is to be had to the accompanying drawings in which—

Figure 11:
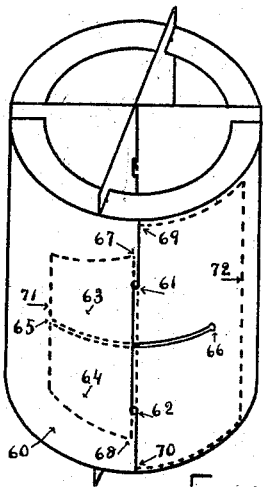
Figure 12:
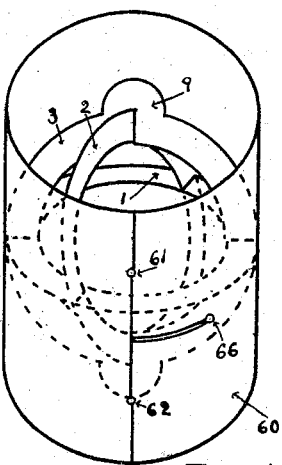
Figure 13:
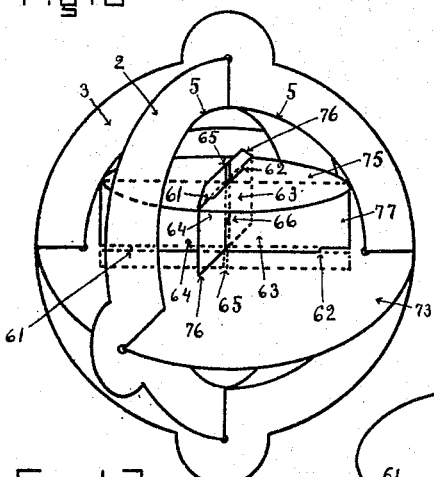
Figure 14:
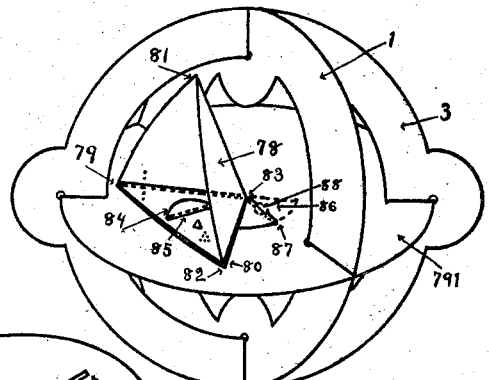
Figure 15:
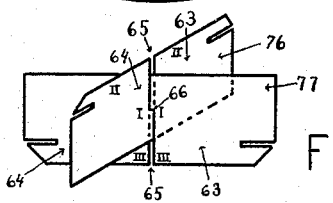
Figure 16:
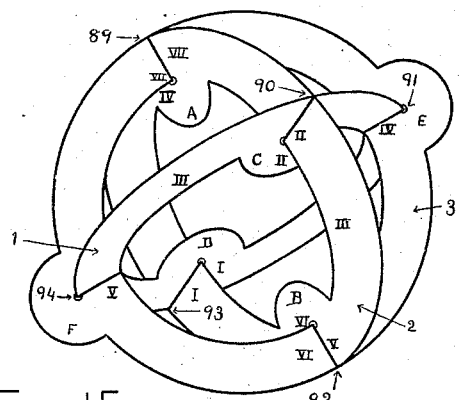
Figure 17:
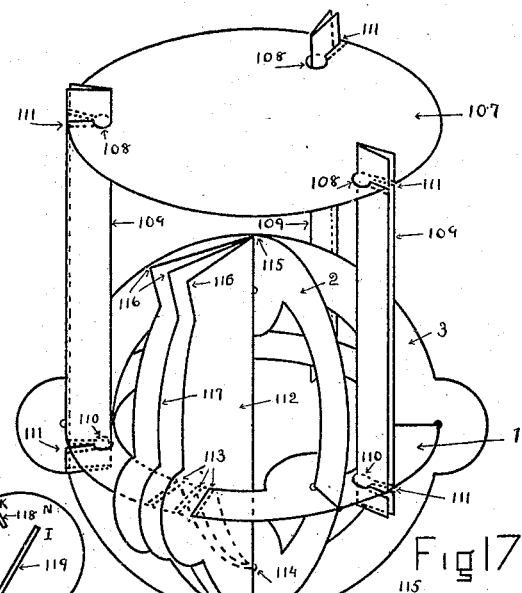
Figure 18:
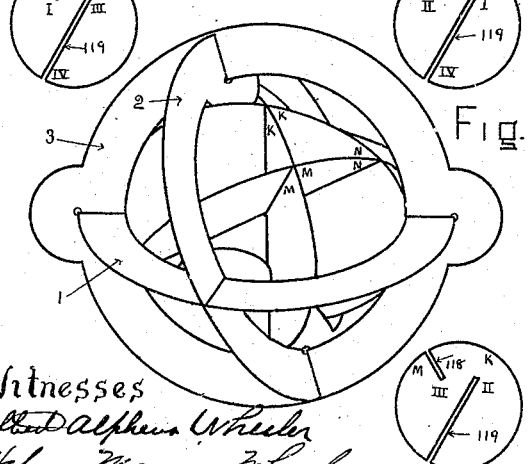

Figure 1 is a perspective view of a preferred form of the invention with three circular blanks of which it is constructed shown in reduced scale. Fig. 2 is a perspective view of a modification of the form shown in Fig. 1 formed by using one of the parts thereof together with two additional parts or members shown in reduced scale as two circular blanks having certain openings or incisions therein. Figs. 3 and 5 are perspective views showing further modifications and the blanks with which they are constructed are shown in reduced scale. Fig. 4 is a modified form shown in perspective. Fig. 6 shows a more general modified form. Fig. 7 shows another modified form with certain additional features and certain modifications of the blanks of which it is constructed shown in reduced scale. Fig. 8 shows another modified form. Fig. 9 shows a form of the invention shown in Fig. 1 in collapsed position and also shows an end or side view of the same indicating the intersections of the collapsed members. Fig. 10 shows another modified form of the invention in perspective. Fig. 11 shows a perspective view of the form of the invention shown in Fig. 10 but with the addition of another part or member which envelops or incloses the parts shown in Fig. 10 in such a manner and method of construction as may be adopted in many other forms of the invention but which is not shown in all. Fig. 12 shows a perspective view of the inclosing or enveloping or surrounding part or member of the invention which appears in Fig. 11, but in this particular figure the enveloping or inclosing member is shown as comprising or including within its boundaries the preferred form of the invention shown in Fig. 1. Fig. 13 is a perspective view of a modified form of the invention but with the addition of certain parts or members disposed or contained within the interior of the same in a manner which may be adopted in many of the forms of the invention but which is shown in a particular form in this figure. Fig. 15 is a perspective view of details of the parts or members included within and appearing in Fig. 13 and shows the manner or method by which they are engaged or may be engaged each with others and indicates the method of assembling the parts with each other. Fig. 14 is a perspective view of a modified form of the invention with the addition of a modified form of a part or member capable of certain motion with reference to other parts shown by means which will be described in detail. Fig. 16 is a perspective view of a preferred form of the invention like that shown in Fig. 1 but showing by its position certain definite relations of the parts. Fig. 17 is a perspective view of the preferred form of the invention such as is shown in Fig. 1, but with additions. A blank which shows the form and manner of construction of one of the added members or parts is shown in reduced scale. Fig. 18 is a perspective view of a preferred form of the invention as shown in Fig. 1 but with the inclusion within its boundary of an assemblage of other additional members shown as assembled separately in Fig. 19 and which parts are shown before being assembled as three circular blanks in reduced scale in Fig. 18.

Referring first to the preferred form shown in Fig. 1, a perspective view is shown of a model having a form which suggests, shows parts of and defines a sphere in its geometrical form, determines the diameter of the same and shows lines upon the surface of the sphere defined and relations between the same etc.

The blanks or parts which are assembled to form Fig. 1 are shown in reduced scale as three rings or portions of plane surfaces, 1, 2 and 3 and which have a general circular outline or boundary.

It will be shown by reference to other figures that other and various shapes and forms may be used to embody the improvements which I am about to explain and describe. In particular, certain blanks are shown in Fig. 3 as having a general rectangular or square outline; in Fig. 6 the general form of the blanks assembled is elliptic. In Fig. 10 rectangular, circular and elliptic forms are shown, and it will be readily understood that many alterations and variations are possible.

Certain of the curves, lines or boundaries as 4 in Fig. 1 will be referred to hereinafter as being outer curves or boundaries, while certain other curves, lines or boundaries as 5 shown in Fig. 1 will be referred to as being inner curves or boundaries. It will be seen that if one of the blanks as 3 of Fig. 1 be caused to move or rotate about an axis which may be taken as any diameter of one of the circles 4 or 5, that the outer circle 4 will generate, create or define by its rotation the surface of a sphere, while at the same time the inner curve or circle 5 will create, generate or define the surface of another sphere which will lie within the surface of the sphere defined by the rotation of the circle 4.

The blanks 1, 2 and 3 have certain parts or portions cut away and removed as shown at 6. Incisions, openings, cuts or slots 7 are made through the outer boundaries or curves of the blanks 1 and 2 as shown and through the inner boundaries or curves of the blank 3 as shown at 8, and the regions of the blanks about or near these cuts, slots or openings as shown in the regions marked 9 are left continuous and will be referred to as tabs.

The blanks forming the model shown in Fig. 1 may be assembled as follows: One of the blanks, as 1, may be placed, by slightly deforming its surface, within the opening 6 of the blank 2, in such a way that the slots or openings 7 of 1 engage with the surfaces of the ring or blank 2, which surfaces are caused to pass within and through and between the incisions or slots 7. In this engaged position it will be found that either of the two engaged parts 1 or 2 may be rotated or moved about the line of intersection or engagement with the other member and may be brought into various angular positions with reference to the same, and the members or blanks may thus be brought together in flat or nearly flat superposed position such as may be seen by referring to Fig. 9. When in such flat superposed position, the slots 7 of the blank 2 which are not in engagement with the surfaces of the other blank, 1, may be made to lie in close proximity to the same and when in such position the third blank 3 may be readily passed over the two superposed blanks 1 and 2 in such a way that the slots or openings 8 made within its surface may be made to engage with the superposed surfaces of the blanks 1 and 2, and the slots or openings of the blank 3 may be brought into engagement with the slots 7 of the blank 2, which are not engaged otherwise. When in such position the members or blanks 1 and 2 may be rotated and separated in an angular sense about their line of intersection passing through the slots 7 of the blank or member 1, in such a way that the slots or openings 7 of one of them, as 2, engage with and contain points of the surface of the member 3. Thus it may be seen that the slots or openings of the surface 1 may be made to engage with points of the surface of the blank 2; the openings or slots of the blank 2 will engage with points of the surface of 3, and the openings or slots of 3 will in turn engage with points of the surface of the blank 1, as shown in perspective view in Fig. 1. Furthermore, it will be seen and understood that when thus assembled, any one of the blanks may be caused to rotate about the line of engagement or intersection determined by the slots or openings with which it engages with a second blank. At the same time the cuts or slots of the rotating blank may be made to travel along or to slide in contact with the surfaces and to assume different positions with reference to the surfaces of the third blank with which they engage. Thus each of the blanks has rotatable and slidable relations with reference to the other blanks with which it is assembled and engaged, and the three blanks may be brought into flat or nearly flat superposed collapsed position with reference to each other, as shown in Fig. 9.

Referring to Fig. 9, there will be seen at 10 a diagram which by the intersecting full lines crossing at the points marked 7 and 8 is intended to indicate the positions with reference to their superposition of the blanks or members 1, 2 and 3 as seen when looking at the assembled blanks in the direction of the arrows 11 and toward the line passing through the points $x$ and $y$. The slots or openings 7 and 8 are shown as being terminated at their ends 12 by circular openings, enlargements or cross-cuts to prevent the further extension of the cuts or openings 7 or 8 along the surfaces or within the body of the tabs or material within and through which they are constructed and formed. Thus, means are provided to prevent the accidental tearing or wearing of the parts engaged.

Because of the fact that two of the blanks, such for example, as 1 and 2 as shown in Fig. 1, are alike, it may be seen that either part may be substituted for the other when making the assembled construction. That is, 1 may be first assembled within 2, or if desired, 2 may be first assembled within 1.

Referring to Fig. 1, it will be seen that the outer boundaries 4, of the assembled sections or blanks generate by their rotation a surface which in the figure shown is the surface of a sphere upon which lie as great circles the arcs of the outer boundaries 4 which generate it. Furthermore, a second spherical surface is generated or defined by the rotation or movement of the inner curves or circles 5, and this inner spherical surface may be said to be defined by the arcs 5 which lie upon it. It will thus be seen that mechanical means have been provided for constructing, showing and illustrating relations, proportions and properties of geometrical and other mathematical forms.

In the preferred form shown in Fig. 1 there have been assembled two so-called inner rings or members 1 and 2, and one so-called outer ring or member 3, but this particular choice of parts is not essential as may be seen by referring to Figs. 3, 6, 8 and 10. Furthermore, it will be found possible to assemble together, if desired, three outside members or blanks in such form as those shown in Fig. 1 and numbered 3.

In Fig. 2 is shown a modified form of the invention in which one outside member, such as the part numbered 3 in Fig. 1, is assembled together with two inner members having forms such as are shown in reduced scale and are numbered 13 and 131. Slots, cuts or incisions 14 are made of such a form that projecting parts or regions 15 referred to as teeth project across and interrupt the general normal course of opening of the slots or openings 14. These teeth 15 are adapted to engage with and pass through suitably formed and situated openings or slots 16 in the outer member 3 with which the said member 13 engages as shown in perspective view in Fig. 2. The surfaces of the blanks or members 13 and 131 are further provided as shown with openings, incisions or cuts 17, which are interrupted by certain projecting parts or regions of the surfaces cut by certain S shaped cuts or incisions 18 which form as shown pairs of teeth which are adapted and designed to engage with openings or slots 19 as shown in Fig. 2.

It may be seen that the blanks or members 13 and 131 may be assembled by causing the surfaces of the blank 13 to be inserted within and along the slot or opening 17 of the blank 131, and at the same time the surfaces of the member or part 131 to be inserted between and along the slot or opening 17 of the member 13 in such a way and to such an extent that the S tabs or teeth of the blank 13 engage with and pass through the opening 19 of the blank 131, while the S tabs or teeth 18 of the blank 131 enter, pass through and engage with the opening 19 of the other blank 13 as shown in perspective view in Fig. 2. When thus assembled it will be seen that motion of rotation about the line of intersection of the parts or members 13 and 131, as determined by the line passing through the two sets of S tabs is possible, but lateral motion of the surfaces 13 and 131 with reference to this same line is restricted by reason of the action of engagement of the S tabs with the slots 19 through which they pass. It will be understood that these members 13 and 131 may be rotated about their line of intersection until they are in flat or nearly flat superposed position with reference to each other, and when in such position the remaining part or member 3 may be assembled or engaged with them in a manner similar to that described for Fig. 1.

It will be seen and understood that by suitably locating the positions of the openings or slots 16 and the openings 14 and teeth 15 with reference to each other and to the line of intersection of the surfaces 13 and 131, that any desired angular opening or inclination of the parts 13 and 131 with reference to each other may be obtained and preserved.

Referring to Fig. 3, the method of assembling the separate members or blanks 20, 21 and 22 which are shown in reduced scale will be understood by examining the perspective view shown, and by following the same general methods and order of engagement of parts as has been already described in detail with reference to other figures. In particular, it will be seen that in this particular form of the invention the blank 20 may be placed within the opening 25 of the blank 21 in such a way that the slots or incisions, 23, of 20, enter and engage with the slots or incisions of the blank 21. The collapsed blanks may then be placed within the opening 27 of the blank 22 in such a way that the blank 20 engages with and slides through the slot 28 of the blank 22, and the openings, 26, of the part 21 engage with or interlock with the openings 29 of the blank 22.

It will be understood from an examination of the perspective view of Fig. 3 that the surface of the sphere generated by and defined by the edges or boundaries, 30, of the assembled blanks, is in the sense with which the term was used in describing Fig. 1, an inner surface with reference to the material elements with which it is surrounded in part and by which it is in a sense defined as a mathematical surface.

The parts or members 32, 33 and 34, as shown in Fig. 4 represent assembled blanks which are essentially of circular outline or form and which are provided with openings within their interior regions and with certain engaging and interlocking cuts or slots as shown. In particular, it will be observed that certain of the engaged or interlocking slots or openings, as those marked 35, are of the same general construction and proportion with reference to each other as are those which are numbered 26 and 29 in Fig. 3.

It will be seen that the action of engagement of the slots at the points numbered 36 serves to restrict the sliding motion of the surfaces through the slots with which they engage, but allows of unrestricted motion of rotation of the engaged surfaces about their line of intersection passing through these points, 36.

It will be seen and understood that Fig. 4 provides for features of construction by which the functions of the tabs shown in Fig. 1 are taken by the regions or parts of the surfaces in the neighborhood of the slots or cuts through which the intersecting surfaces pass.

While the forms of construction shown in Figs. 1, 2 and 4 are those of spheres or spherical surfaces, I do not wish to be understood as limiting myself to such restricted forms of construction.

An examination of Fig. 5 will show a modification of the general construction shown in Fig. 3. In particular, the blanks 37, 38 and 39 show in reduced scale elements of a general nature which relate them in a general way with the blanks shown in Fig. 3.

It will be seen that the perspective view shown in Fig. 5 suggests or in a sense defines by its edges an octahedron, and many interesting and important forms and figures may be built up and constructed by the general means and methods shown and described.

Fig. 6 is a perspective view of an ellipsoid which possesses many of the elements of construction shown and described in the other figures. The projections or teeth 40 play the same part and have the same functions with reference to the parts with which they are arranged as the S tabs or teeth, 18, of Fig. 2, or the teeth, 15, of Fig. 2 have with reference to the parts with which they are engaged.

In Fig. 7 is shown a sphere which may be constructed or built up by assembling or engaging together three blanks or members, such as 3 of Fig. 1 and blanks 41 and 42 shown in reduced scale in Fig. 7. It will be observed with reference to Fig. 7 that the slots or openings in the blank 41 are made in the opposite sense with reference to similar cuts or openings made in the blank 3 of Fig. 1. Furthermore, there is presented in the blank 42 a certain double construction of projecting parts or regions previously referred to as tabs.

In assembling the parts or members shown in Fig. 7 in perspective view, 42 is first engaged within 41 and the two parts thus assembled are then engaged within the part or member, 3, as shown in Fig. 7. The assembled members are then secured in fixed relation with reference to rotation about their common line of intersection by means of an additional member 43, provided with slots or incisions suitably placed and adapted to engage with the projecting members or tabs of the assembled parts as shown at 44.

In Fig. 8 the two sectional or skeleton parts or members 45 and 46 are adapted by means of slots or openings to engage along a line of intersection passing through 47 and 48. The angle of inclination of this line of intersection with the slots or incisions 49 which are made in and through the members or parts 45 is different from the angle made with the slots 50 which are formed in and through the member 46. Thus, when the members 45 and 46 are rotated about their line of intersection passing through the points 47 and 48, so as to lie in flat or nearly flat position with reference to each other, the angles formed by this line with the openings 49 and 50 will remain different, and as a result the parts or members 51 engaged with and passing through these slots or openings 49 and 50 will be caused to rotate and will be brought into flat or nearly flat position with reference to each other and to the parts or members 45 and 46.

Figs. 10, 11 and 12 in which the parts shown in perspective are assembled to show and define certain elements of a cylinder and a cylindrical surface. In particular, in Fig. 10, the parts or members 52 and 53 are shown as engaged with each other along a line of intersection passing through the points 54 and 55 and the slots or cuts by which and with which the parts are engaged are shown by full and dotted lines. It will be understood by referring to the figure that the edges or boundaries such as those marked 56 sweep out or define by their rotation or motion about the line of intersection of the surfaces 52 and 53, cylindrical surfaces. At the same time the parts or members 57 and 58 engaged with the parts 52 and 53 may be taken as defining the ends or bases of the cylinder.

In Fig. 10 it will be seen that the angles of inclination between the plane of the part 59 and the line of intersection of the parts 52 and 53 are different when measured in the planes of the parts 52 and 53. As a result it may be seen that when the parts 52 and 53 are caused to rotate about their common line of intersection, the parts 59 will also at the same time be caused to move in such a way that when the parts 52 and 53 are brought into flat or nearly flat position with reference to each other, the part 59 will also be brought into flat or nearly flat position with reference to the same parts 52 and 53. The motions of the parts 57 and 58 as shown are not restricted in the same way, but these parts or members as shown are free to be moved or rotated within certain limits while the remaining parts which are shown in the figure remain in flat or nearly flat position with reference to each other. Furthermore, it will be seen and understood by referring to Fig. 10 that when the parts or members 52 and 53 are inclined at any specified angle with reference to each other and their line of intersection, the angles of inclination of the parts 57, 58 and 59 with reference to each other and to the same line of intersection will be determined thereby.

It will be recognized that great interest may be aroused by the use of such means and methods as I am now describing, and furthermore, it will be possible to apply such means to many useful applications in the arts and sciences.

Fig. 11 is a perspective view of the form of the invention shown in Fig. 10, but with the addition of an enveloping, inclosing or surrounding member or part 60, which may be taken as representing, showing or defining the cylindrical surface of the cylinder, some of whose elements are shown in Fig. 10. This part, 60, as shown consists of a flat part, band or member wrapped about the parts or members shown in assembled form in Fig. 10. It is provided with means whereby it may be retained in position about such inclosed or contained members as may be necessary for the purposes for which it is provided and intended. This part or member, 60, is provided with a slot or opening extending between the points 61 and 62 through which is passed a part or portion of its surface as shown in dotted lines surrounding in part the regions 63 and 64. These parts or regions 63 and 64 may be described in a general way as consisting of a split tab, the parts 63 and 64 of which lie separated by a cut or incision extending from 65 to 66 as shown. They are further provided with cuts, or with slots or openings or with such configuration of boundary that the distance between certain points as shown at 61 and 62 is less than the distance between other points as 67 and 68, when the tabs or regions 63 and 64 lie in normal position with reference to each other. Thus, as shown, in engaged position in Fig. 11 the portions or regions between the points 67 and 61, and between 68 and 62 form shoulders or checks which serve as means to prevent or to obstruct the removal or withdrawal of the parts or members 63 and 64 from engagement with the slot or opening extending from 61 to 62. Furthermore, the portions or regions of the member 60 lying between and extending from 69 to 61, and from 70 to 62 also form shoulders or checks operating as means to prevent or obstruct the further motion of the parts or regions 63 and 64 through the slot from 61 to 62. The extreme opposite edges or boundaries of the inclosing or surrounding part or member 60 are shown by dotted lines 71 and 72.

The function of the cut or incision from 65 to 66 is to provide means whereby the parts or inserted regions 63 and 64 may by slightly deforming the surfaces from their normal position with reference to each other be brought together in partly overlapped position with reference to each other, in such a manner and to such an extent that the extreme distance between the points 67 and 68 shall be not greater than the extreme or greatest distance between the ends 61 and 62 of the slot or opening through which they are intended and adapted to pass and be inserted. It will be understood that when the points 67 and 68 of the shoulders of the regions or tabs 63 and 64 have passed through the slot 61 to 62 that the tabs or regions 63 and 64 may be caused or allowed to resume their normal positions with reference to each other and to the line of separation between them in such a way that they no longer lie in overlapped position with reference to each other. The restraining action of the surfaces of the member 60 as exerted along the edges of the slot or opening from 61 to 62 will be such as to tend to retain the inserted parts or members 63 and 64 in their normal position with reference to each other and thus will serve to act to prevent or obstruct the removal or withdrawal of the parts from engaged or interlocked position. It will be understood that such a method of forming and securing in position an enveloping or inclosing member or part may be applied in a great variety of ways to many forms of the invention. In particular, it will be seen that in Fig. 12 the important and interesting properties and relations existing between a cylindrical surface and an inscribed sphere is here shown. The preferred form of the invention shown in Fig. 1 is here shown in full and dotted lines and the inclosing, surrounding or enveloping surface or part in full lines. Thus, I have shown very definite relations which may be seen to exist between the forms of the invention already described and it will be understood that the elements of interchangeability or of addition of or of substitution of parts or members with reference to others provides means whereby the general usefulness and practical application of the device to the uses for which it is adapted and designed is greatly increased and extended.

In Fig. 13 is shown a somewhat modified form of the invention in which the parts are assembled to represent, suggest or define a sphere. The edges or inner boundaries 5 generate by their motion and hence define in a mathematical sense a spherical surface, which, with reference to the parts assembled, may be referred to as an inner spherical surface within which is contained or inclosed, in part, a cylinder, suggested and defined by certain added members or parts shown in the figure in full and dotted lines. This cylinder is shown as being constructed upon one side of the member 73 and the details of its construction and the manner of engagement of its parts is shown and suggested in Fig. 15. In Fig. 15 the part 74 is shown as being of different diameter from the part 73 of Fig. 13, but it possesses the necessary essentials by which relations are established between it and the other parts assembled therewith.

Referring to Figs. 13 and 15 it will be seen that the regions or parts 63 and 64 of the members or parts 76 and 77 have the same general relation to each other as the like numbered parts shown and described in Fig. 11. The cuts or separating incisions extending from 65 to 66 are shown in detail in Fig. 15.

It will be observed that the method of assembling the parts as shown in Fig. 15 is somewhat different from that employed in the assembling of like numbered parts in Fig. 11, in that the parts or members 76 and 77 are engaged, each with the other, through and along the slots or incisions or openings extending from 65 to 66. Referring to Fig. 15 it will be seen that the slots, openings or cuts extending from 61 to 62 in the members 74 and 75 are designed and adapted to have the same relation to each other and to perform the same functions as like numbered parts shown and described in Fig. 11. There is, however, this important distinction and difference, that in Fig. 11 all of the parts shown in the enveloping or inclosing member or part 60 are shown as existing and being formed in and out of the same surface or part, while in Fig. 15 the parts described and shown are formed in, through and out of different and separate members or parts 74, 75, 76 and 77. It will be seen, however, by referring to Fig. 13, that when the assembled parts shown in detail in Fig. 15 are assembled as shown, that the parts or functions taken by the several regions, openings, cuts, tabs, etc., described, are, in general, the same as those shown and described in detail with reference to Fig. 11.

Referring to Fig. 15 it will be seen that the members 76 and 77 may be caused to rotate about their common line of intersection passing through the engaging slots and may thus be brought into flat or nearly flat superposed position with reference to each other.

Fig. 14 shows a perspective view of a modified form of the invention, representing, suggesting and defining a sphere. The parts or members 1 and 3 as shown are similar to those designated by like numbers shown in the preferred form in Fig. 1 and in other views, and the part 791 is of the same general form and construction as the part 73 shown in Fig. 13. It possesses, however, slightly different features in the details of its construction. The member or part 78 shown in Fig. 14 is an additional part constructed from a blank or part having an essentially circular outline or form. In Fig. 14, as shown, this part 78 is constructed from a blank of the same circular dimensions as the outer boundaries of the parts or members 1, 3 and 791. The blank is shown in Fig. 14 as being folded along certain lines issuing from the point 83 and passing through certain points 79, 80 and 81 of the outer boundary. Certain regions or portions of the surface of this blank are brought together and overlapped as shown in Fig. 14 by the regions bounded by the points 79, 80 and 83, and as suggested and shown in the figure by full and dotted lines. Through one of these overlapping regions or parts an incision, cut or slot, 85, is made as shown by full and dotted lines. Through this incision or cut is caused to pass a suitably formed and situated tab or part, 84, made by a suitably formed cut or incision in the other of the two overlapping surfaces or parts. By suitably placing the incision or slot 85 and the engaging tab or tooth, 84, with reference to each other and to the surfaces in and with reference to which they are formed and constructed, it may be seen that means are provided for retaining the overlapped or superposed surfaces in position of contact with each other. Furthermore, it will be seen that the action of the free edge of one of the overlapping parts as shown as extending from 79 to 83 in full line against the surface of the face determined by the points 79, 81 and 83 in Fig. 14 will be such as to oppose the disengagement or unlocking of the engaged or interlocked slot, 85, with the inserted tab, 84, and thus the member or part 78 will be retained in its desired form of configuration as shown. Furthermore, it will be seen that because of the relations of size and shape of the parts 1, 3, 791 and 78 that the outer boundaries of the member 78 passing through the points 79, 80 and 81 may be placed and retained in such a position as to be situated upon the surface of the sphere defined by the outer boundaries of the members 1, 3 and 791 as shown. If, now, the points 79, 80 and 81 are placed at a radial distance from the center of the sphere defined by the boundaries of 1, 3 and 791 equal to the radius of the same sphere and are retained at the same radial distance from the same central point, then it will be seen that the points 79, 80 and 81 may be caused to move about upon the surface of the sphere and to occupy different positions upon the same.

By referring to Fig. 14 it will be seen that one of the two overlapping regions or parts in contact within the region bounded by the points 79, 80 and 83 is provided with an extended part or portion 86 shown in full and dotted lines. This tablike extension or part 86 is shown as being inserted through a slot or opening 87 made in and through the member 791 beginning at the geometrical center in the figure shown at 83 and extending therefrom in a radial direction. At a point in its length, this opening, cut or slot is shown at 88 as being interrupted or obstructed with reference to its general direction by a member or part which normally projects across and obstructs the opening in the same way and manner as the teeth 15 in Fig. 2 or the S tabs in Fig. 2 obstruct the opening or slot through which they project. The inserted part or member 86 is provided as shown in Fig. 14 with a suitable slot or opening through and with which the inserted tooth or tab 88 is shown as being inserted and engaged. It will thus be seen that means are provided for retaining the inserted member 86 in engaged position with the member 791.

By examining Fig. 14 it will be seen and understood that the spherical triangle suggested and defined by the arcs passing through the points 79, 80 and 81 may be caused to move about and upon the surface of the sphere defined by the outer boundaries of the assembled members 1, 3 and 791 and may be caused to take different positions thereon.

Fig. 16 is a perspective view of a preferred form of the invention so placed that the points 89, 90 and 91 and their symmetrical points as 92, 93 and 94 with reference to the center of the sphere may be conveniently seen. These sets of points determine with reference to the surface of the sphere shown two symmetrical spherical triangles 89, 90, 91 and 92, 93 and 94.

Fig. 17 is a view of the preferred form of the invention with the parts 1, 2 and 3 assembled in perspective view and there is also assembled therewith a group of assembled parts the construction and function of which will now be described in detail. The added part or member, 107, is provided at suitably situated points in its surface with openings, 108, through which pass and with which engage or interlock certain members or parts, 109, which will be referred to and described as supporting or connecting members. These supporting or connecting members are caused to engage with and pass through the openings 108 and also through other openings or incisions 110 shown as being made in one of the members, 1, of the preferred form shown in Fig. 17. These supporting members are shown as being strengthened or stiffened by being folded along their length and incisions or openings are made in and through their surfaces as shown in the regions designated by the number 111. Means are thus provided for engaging the supporting members with the parts 107 and 1. The position of the part 107 is determined and controlled by the construction and positions of the supporting parts, 109, and by moving 107 with reference to the other assembled parts, the distance between 107 and other parts, such, for example as 1, may be made to change. It will be seen that by properly proportioning the parts that the outside member, 107, may be caused to move with reference to the assembled parts shown in Fig. 17 as defining a sphere, so as to be at some time in the position of a plane tangent to such a spherical surface.

In Fig. 17 there is also shown in reduced scale a blank or member, 112, which as shown has two openings or slots, 113, connected by an incision or cut made along the full line connecting the two slots and passing through the point 114. The form of the blank shown in reduced scale in Fig. 17 is somewhat similar to the form of one of the blanks shown in Fig. 1, but there is this difference, that the blank shown in Fig. 17 has a part of the boundary or outline shown as extending from and between the points designated by the number 116, a straight line which is tangent to the circle which passes through other points of the boundary. If, now, the blank shown in Fig. 17 is bent or folded along the dotted line passing through the points 114 and 115, it may then be seen that it may easily and readily be assembled with and made to engage with one of the members as 1, as shown in perspective view in Fig. 17. This may be effected by causing certain regions of one of the parts, as 1, to enter and engage with the slots or openings, 113, as shown. It will then be seen that the region or part of the member 112 formed by the incision or cut passing from one of the openings, 113, to the other and through the point, 114, acts as a restraining means to prevent the accidental disengagement of the parts 112 and 1 as shown.

If the blank shown in Fig. 17 in reduced scale be cut along the dotted line, it may be seen that one or more of these parts shown as 117, if desired, may be assembled with the other parts as shown in the perspective view. When in such position it will be seen and understood that the lines or edges extending between the points 115 and 116 may be taken as suggesting and defining lines tangent to the sphere defined by the assembled parts, 1, 2 and 3, and by the means shown and described these lines passing through 115 may be moved about in the plane determined and defined thereby. Furthermore, it will be seen that the outside member, 107, may be brought into the plane determined by the lines through 115 and its surface may be brought into contact with these edges.

Figure 19:
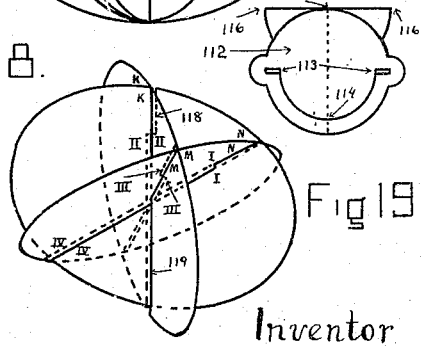

Fig. 18 is a perspective view of a preferred form of the invention having included within its limits or boundaries certain additional members or parts which are shown separately in assembled position in Fig. 19 in perspective view. The three circular blanks shown in reduced scale in Fig. 18 are the parts or members which are assembled together to form the construction shown in Fig. 19. These blanks as shown consist of three circular members having incisions or openings, 118 and 119, made therein in relatively opposite or contrary directions. They are readily assembled by causing the slot or opening, 118, of one of them to enter and engage with the slot or opening 119 of a second blank, at the same time causing the slot, 118, of the second blank to enter the opening, 119, of the third blank and engage therewith, while the opening, 118, of the third blank engages with the slot, 119, of the first blank.

In the description of the figures and drawings it has been assumed, thus far, that the proper parts have been assembled, engaged and interlocked as shown and described, but it will be found in practice that it is very important to be able to indicate and designate which of several parts or members can or should first be brought together in desired relations and assembled or engaged before other parts, and in particular it should be observed that certain orders of such operations are matters of convenience and at other times of necessity for the proper placing and functioning of the parts.

In the perspective view shown in Fig. 1,

I have indicated a preferred order of assembling the parts by means of the Roman numerals, I, II, III, IV, V, VI, VII. These numerals are employed to indicate and show that the parts or regions numbered I should first be brought together, then those successively designated by the Roman numerals II, III, IV, etc., until, finally, those numbered VII are brought together. Thus it will be seen that the Roman numerals, I and II indicate the engagement of the member or part 2 with the member, 1, by passing the regions of 2 designated by I and II through the slots of 1 designated by the same numerals I and II respectively. To bring the regions designated by the Roman numerals III together, it is necessary to rotate the members 1 and 2 about their line of engagement or intersection with each other into flat or nearly flat position with reference to each other. The insertion of these collapsed parts within the openings or slots of the member, 3, is then indicated by the Roman numerals IV and V. When in such inserted position the opening or separating apart of the assembled members required in order to bring the regions designated by the Roman numerals VI and VII respectively into proximity, results in opening out the assembled parts into the configuration of parts shown in perspective view in Fig. 1.

Roman numerals are used in other figures for similar purposes, such, for example, as in Figs. 9, 10, 15, 16, 18 and 19, and in particular it will be observed with reference to Fig. 10 that the numerals IV and XII are not shown in this figure because of the fact that the points which they would designate cannot be seen in the perspective view shown in Fig. 10, considered as being opaque.

Of course it will be understood that any sets or groups of symbols or characters which are recognized as occurring in some definite order of succession may be used for the purpose for which the Roman numerals have just been described as being applied.

I find it convenient also to use certain means for indicating or designating certain parts, portions or regions of the same or of two or more members which are adapted to be brought together for the purpose of assembling the same in some desired construction. I have accomplished this result by placing a group of three marks or dots as shown in the blanks in Fig. 2 near the opening 17 of 131 and also a group of similarly disposed dots in a region of the blank 13 which is intended and adapted to engage with the opening or slot 17 of the other blank, 131. The parts or members in assembled position with the two groups of three dots each in neighboring positions thereon are shown in perspective in Fig. 2. Similar results may also be obtained by employing conventional or arbitrary symbols or marks or groups of such. Such means are employed and shown in Fig. 6 in which the two arbitrary signs + and also similarly disposed sets of three dots each are used. Similar means which will be readily recognized are used in other figures, such, for example, as in Figs. 14 and 17.

Certain regions or surfaces require to be overlapped or assembled and placed in superposed position with reference to each other in order to effect a desired construction or configuration of parts as in Fig. 14, in which it is necessary to place two surfaces or regions of surfaces in contact of superposition in order to obtain a desired form of construction. I have used in Fig. 14 the Greek letter delta Δ shown in full and dotted lines to suggest or indicate that the regions on which these letters appear should be brought together in contact as shown in the figure.

In Fig. 1, I have employed the letters A, B, C, etc. for the purpose of indicating and designating certain regions or points of the assembled figure. Thus convenient means are provided for referring to and pointing out relations and properties of the device in its assembled form.

Further reference to Fig. 1 will disclose another feature of my invention which I will now describe.

It will be seen by referring to the blanks that the boundaries as shown in Fig. 1 are essentially circular but they are interrupted by projecting regions or tabs and the circles forming the general outlines of the same are interrupted at certain of these points. If, now, lines be drawn across or upon the tabs as shown by the full lines in the regions of the tabs in Fig. 1, it will be seen that such lines as are drawn as shown serve to further define the circles which in part form the bounding edges of the several blanks shown.

A full line is shown as being drawn on the blank 112 in Fig. 17 to show the relation between the straight edge of the same with reference to its relation as being tangent to the circle forming the general circular outline of the blank as shown.

It will be understood that lines may be drawn upon the surfaces of the material of which the device described is constructed for the purpose of showing and defining many and various relations and properties thereof.

The invention has been shown and described as being built up and assembled of parts which are readily and directly adapted to be assembled and separated at will. Such possibility of use and operation is very desirable and important, yet I realize that it may be desirable to retain in assembled or engaged relation or position certain forms of assembled parts by means outside of themselves. Thus for example, members or parts may be secured together permanently by gumming, sticking, pasting or causing parts to adhere to each other or to additional means by any means whatsoever, or by well known means for fastening parts together, whether permanent or temporary.

I am aware that various methods and means may be devised and employed to secure the ends such as I have described and I recognize that such means for securing parts together may at times be desirable, but I do contend that the figures and forms such as I have shown and described as well as many others which may be readily conceived of and constructed are by means such as I have shown and described capable of being easily constructed, assembled and preserved and are easily collapsed and may be conveniently kept and carried about in small compass and by the mechanical action of their parts they are durable and adapted to maintain desired configurations of parts. Also, because of certain elements of interchangeability many different applications may be made with reference to the same part and combinations of parts may be devised which will result in the construction of a great number of different forms and configurations from a relatively small number of parts.

While I have illustrated and described a large number of modifications, I am aware that many changes may be made in them and that many other forms can be constructed and that features of each modification may be applied to others within the scope of this invention as expressed in the claims. Therefore, I do not wish to be limited to all of the forms shown, but What I do claim is:—

1. In a device of the character described, the combination of three members of sheet material having slits for receiving portions of each other and connected together at the slits so that each member crosses one of the others, one member being capable of rotating through an angle with respect to a second member independently of the position of the third member, and without becoming disengaged from either of said other members.

2. As an article of manufacture, a model comprising a plurality of members of sheet material connected together so as to cross each other and define a body having three dimensions, certain of said members being provided with slits for receiving portions of another member and being movable on said other member toward and from each other, whereby said other member constitutes guides for them.

3. As an article of manufacture, a mathematical model of the class described comprising three plane members having means at their edges constituting guides for each other, certain of said members being movable relatively to others along said guides while connected therewith, one member being rotatable on an axis located in the plane of the second member, and the third member being rotatable on the second in all positions of the second member.

4. As an article of manufacture, a mathematical model comprising a plurality of members formed of sheet material, said members having slits at their edges, receiving each others' edges and constituting guides for each other, said members being rotatable relatively to each other while connected together and guided by the slits.

5. As an article of manufacture, a mathematical model comprising a plurality of plane members of geometrical form, two of said members being rotatable about an axis relatively to each other and both being rotatable about said axis together relatively to a third, said members each having means for engaging and guiding the edge of one of the other members.

6. As an article of manufacture, a mathematical model comprising three members of sheet material, said members having interengaging guides for each other, certain of said members being relatively movable along said guides, and also being independently rotatable about axes in their own planes.

7. In a device of the character described, the combination of three plane members, certain of said members having their centers removed, whereby the interior of the structure can be observed, said members also having slits at their edges constituting guides for each other, the edge of each member passing through and engaging with the slits of a second member, the edges of which second member passing through the slits in the third member, while the edges of the third member pass through slits in the first member, whereby said parts are capable of motion relatively to each other through the respective slits.

8. In a device of the character described, the combination of three plane members of a circular shape, certain of said members having central circular openings therethrough, and said members being provided with radial slits extending through a space equal to the width of the member between its outer edge and the said central opening thereof, said members all being of the same diameter, whereby one of said members can pass through the slits in another and have its outer and inner edges register with the outer and inner ends of the slits thereof, said members being provided with tabs each extending around the end of one of said slits.

9. In a device of the character described, the combination of three members of sheet material of a circular shape, provided with radial slits extending from their edges, said members all being of the same diameter, whereby the edge of one of said members can pass through the slits in another and have its outer edge register with the outer ends of said slits, said members being connected around one end of each slit.

10. In a device of the character described, the combination of a plurality of plane members, said members having slits therein extending from the defining edges thereof, the edges of each member extending through the slits of another member and movable in said slits, certain of said members being adapted to have their relations of engagement relative to each other interchanged so that instead of one of said members engaging in slits of the second the second may be arranged to engage in slits of the first.

11. In a device of the character described, the combination of three integral plane members connected together so that each one crosses both of the others and having slits for receiving each other's edges slidably, said members being assembled together to define a body having three dimensions and being collapsible flatwise into substantially the same plane.

12. In a device of the character described, the combination of a plurality of integral plane members connected together so that each one crosses both of the others, and means whereby one member is capable of rotating about a central axis located in the plane of one of the other members without becoming disengaged from either of said other members, said members being provided with designating characters located adjacent to the points at which they cross each other for convenience in assembling.

13. As an article of manufacture, a model comprising a plurality of members of sheet material, one of said members having a slit extending from its edge, through which another of said members movably passes, the first named member being provided with a projecting tab extending around the end of the slit and connecting the material on opposite sides of the slit.

14. As an article of manufacture, a model comprising a plurality of members of sheet material, one of said members having a slit extending from its edge and of a length substantially equal to the width of that member, and having an integral tab extending around the end of the slit to hold the two parts on opposite sides of the slit together, another of said members passing into the slit.

15. As an article of manufacture, a model comprising a plurality of members of sheet material, one of said members having a pair of slits extending from its edges and another one of said members extending into said slits, said slits being so arranged relatively to each other that motion of the second member away from the other in one direction is arrested by the end of one slit and motion away in another direction is arrested by the end of another slit.

16. As an article of manufacture, a model comprising a plurality of members of sheet material, one of said members having a pair of oppositely located slits in alinement with each other but extending in opposite directions from their closed ends, another of said members extending into said slits at its opposite edges, whereby the second member cannot be removed from the first member except by motion in a direction parallel to the plane thereof without distortion of one of said members.

17. As an article of manufacture, a model comprising a plurality of members of sheet material, one of said members having slits, another of said members extending into said slits whereby the slits constitute guides for the second member and the second member constitutes guides for the slitted member, said slits being arranged to prevent removal of the second member from the first member except by motion in a direction parallel to the plane thereof without distortion of one of said members.

18. As an article of manufacture, a model comprising a plurality of members of sheet material, one of said members having means for holding another and preventing their separation without distortion, said means comprising slits for receiving the edges of the other member, said two members being connected with a third member and being movable together with respect to it.

19. As an article of manufacture, a model formed of sheet material and having an incision therethrough, two projections extending into and through said incision in the same plane and abutting against each other in said incision, and together filling the incision length-wise thereof.

20. In a device of the character described, the combination of a plurality of members of sheet material having slits receiving portions of each other, whereby said members are connected together, one of said members having an incision and another having two opposite adjacent tabs entering said incision from opposite sides for assisting in removably connecting the two last-named members together.

21. In a device of the character described, the combination of a plurality of plane members having means for holding the members together, but permitting each member to rotate about a central axis located on one of the other members without becoming disengaged from the third member, certain of said members having incisions therethrough extending first on one side and then on the other side of a line so as to produce two tabs extending in opposite directions from the said line and another of said members having a slit therein for receiving said tabs from opposite sides thereof.

In testimony whereof I have hereunto set my hand, in the presence of two subscribing witnesses.

ALBERT HARRY WHEELER.

Witnesses:
ALBERT ALPHEUS WHEELER,
HELEN MARION WHEELER.

Copies of this patent may be obtained for five cents each, by addressing the "Commissioner of Patents, Washington, D. C."